United States Patent [19]
Hodgson

[11] Patent Number: 5,605,421
[45] Date of Patent: Feb. 25, 1997

[54] DUST EXTRACTOR

[75] Inventor: Phillip Hodgson, Carlisle, Great Britain

[73] Assignee: Black & Decker Incorporated, Newark, Del.

[21] Appl. No.: 429,690

[22] Filed: Apr. 27, 1995

[30] Foreign Application Priority Data

Apr. 28, 1994 [GB] United Kingdom .................. 9408403

[51] Int. Cl.⁶ ..................................................... B23B 47/34
[52] U.S. Cl. .............................. 408/67; 15/339; 15/415.1; 175/209
[58] Field of Search .............................. 408/67; 409/137; 173/75; 175/209, 211; 15/339, 415.1

[56] References Cited

U.S. PATENT DOCUMENTS

| | | | |
|---|---|---|---|
| 3,033,298 | 5/1962 | Johnson | 175/209 |
| 3,351,143 | 11/1967 | Seibold et al. | 175/209 |
| 4,184,226 | 1/1980 | Loevenich | 408/67 |
| 4,205,728 | 6/1980 | Gloor et al. | 175/209 |
| 4,471,884 | 9/1984 | Gallagher | 175/209 |
| 4,713,858 | 12/1987 | Kelber | 15/339 |

FOREIGN PATENT DOCUMENTS 2646369  11/1990  France ...................................... 408/67

Primary Examiner—Steven C. Bishop
Attorney, Agent, or Firm—Oliff & Berridge

[57] ABSTRACT

A dust extractor (10) for use with a power drill comprises a housing (12) having two compartments (16) and (18) sealed from one another and a tube (26) extending from the opening (16) to an outlet (38). The tube (26) has a valve (28) having a recess (28A) enabling a flow of air to pass from the opening (16) to the outlet 38 whilst the vacuum is applied to the housing. Operation of the valve (28) enables waste material to be drawn from the working site and for suction to be released.

16 Claims, 3 Drawing Sheets

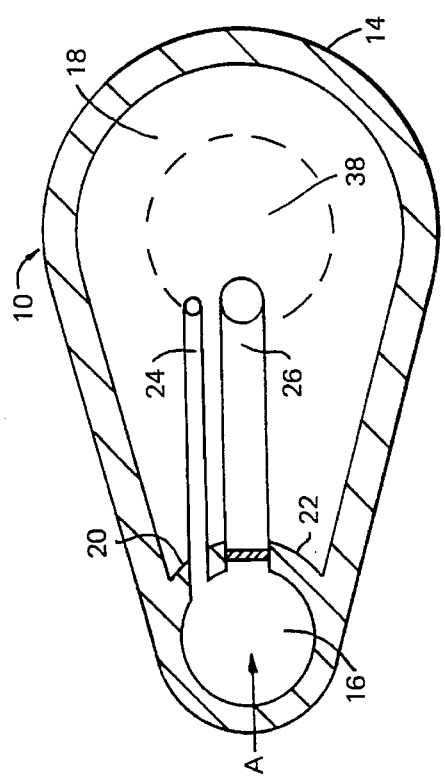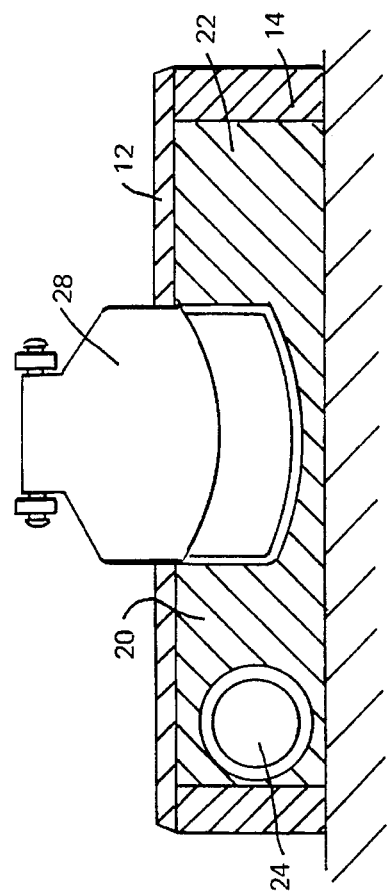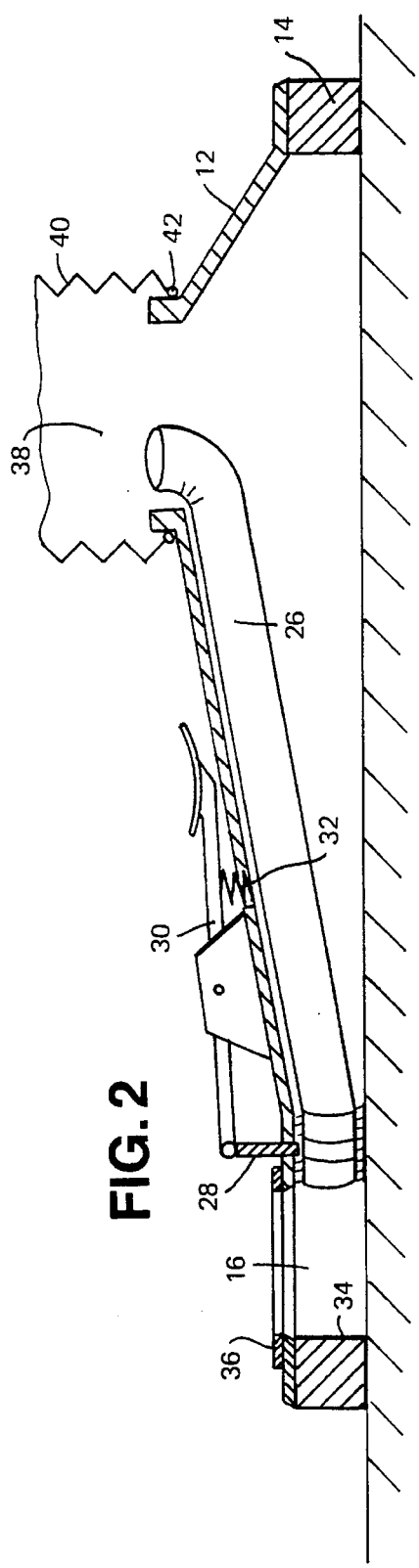

DUST EXTRACTOR

The present invention relates to a dust extractor.

A dust extractor according to the present invention is particularly useful in connection with hand tools and power tools, such as a drill. It is well known that when using power drills to drill holes in building materials such as plaster, brick or plasterboard, a considerable amount of waste material in the form of dust is created. This dust falls to the floor and on to skirting boards and other surfaces. This dust has to be removed and causes considerable inconvenience.

The present invention seeks to provide a dust extractor enabling the waste material to be removed from the area of the hole being drilled and taken to a suitable receptacle so that the dust does not come into contact with surfaces such as carpets and skirting boards from which is subsequently has to be cleaned.

The present invention also seeks to provide a dust extractor which is easy to use leaving the operator with both hands free to use the power drill or other tool.

The present invention further seeks to provide a dust extractor which can be used with a relatively wide range of drill or other tool sizes.

According to the present inventor, there is provided a dust extractor for use with a hand or power tool, the dust extractor comprising at least two compartments which are in fluid communication with each other, sealing means to allow each compartment to be sealed to a surface, one of the compartments having an opening to provide access to the surface for a tool and the other compartment having an outlet which is connectable to a suction source, the compartments being connected by at least one fluid passage which can be at least partially closed off by a valve.

The sealing means can be arranged around the periphery of each of the compartments and the sealing means can comprise a strip of compressible materials such as synthetic or natural rubber.

The at least two compartments can be contained within a single housing.

The at least two compartments can be divided from each other by means of two lengths of sealing material with a gap provided between the lengths of sealing material to allow air to flow through the at least one fluid passage.

The opening can be reinforced e.g. with a steel washer or bush to allow access for a tool such as a drill to the surface to be drilled.

The outlet can be provided with a length of flexible hose for attachment to a vacuum source.

The hose can have means for attachment to the inlet of a vacuum cleaner or other vacuum source.

The attachment means can comprise a length of material secured at one end to the flexible hose, the other end of the length of material being wrappable around the inlet to a vacuum cleaner and to be secured thereto.

The housing can be provided with a valve allowing the suction to be released from within the housing.

The valve can be in circular form or in the form of a slide.

Preferably the housing is formed from a transparent material so that the user can see the surface which is to be drilled or operated upon.

The two compartments can be connected by two tubes, the flow through one of which is controlled by a valve.

In another arrangement, the two tubes are combined in effect into a single tube having a control valve and the control valve has an opening enabling a lower flow of air to pass through the tube when the valve is closed and suction applied. Operation of the valve enables larger pieces of debris to flow to the outlet in order to prevent blockage. The valve can be located at the inlet to the tube or downstream of the inlet to the tube.

The present invention will now be more particularly described with reference to:

FIG. 1 which shows a plan view of one form of dust extractor according to the present invention;

FIG. 2 shows an elevation of the dust extractor shown in FIG. 1;

FIG. 3 shows a view on arrow "A" FIG. 1;

Figure 4:
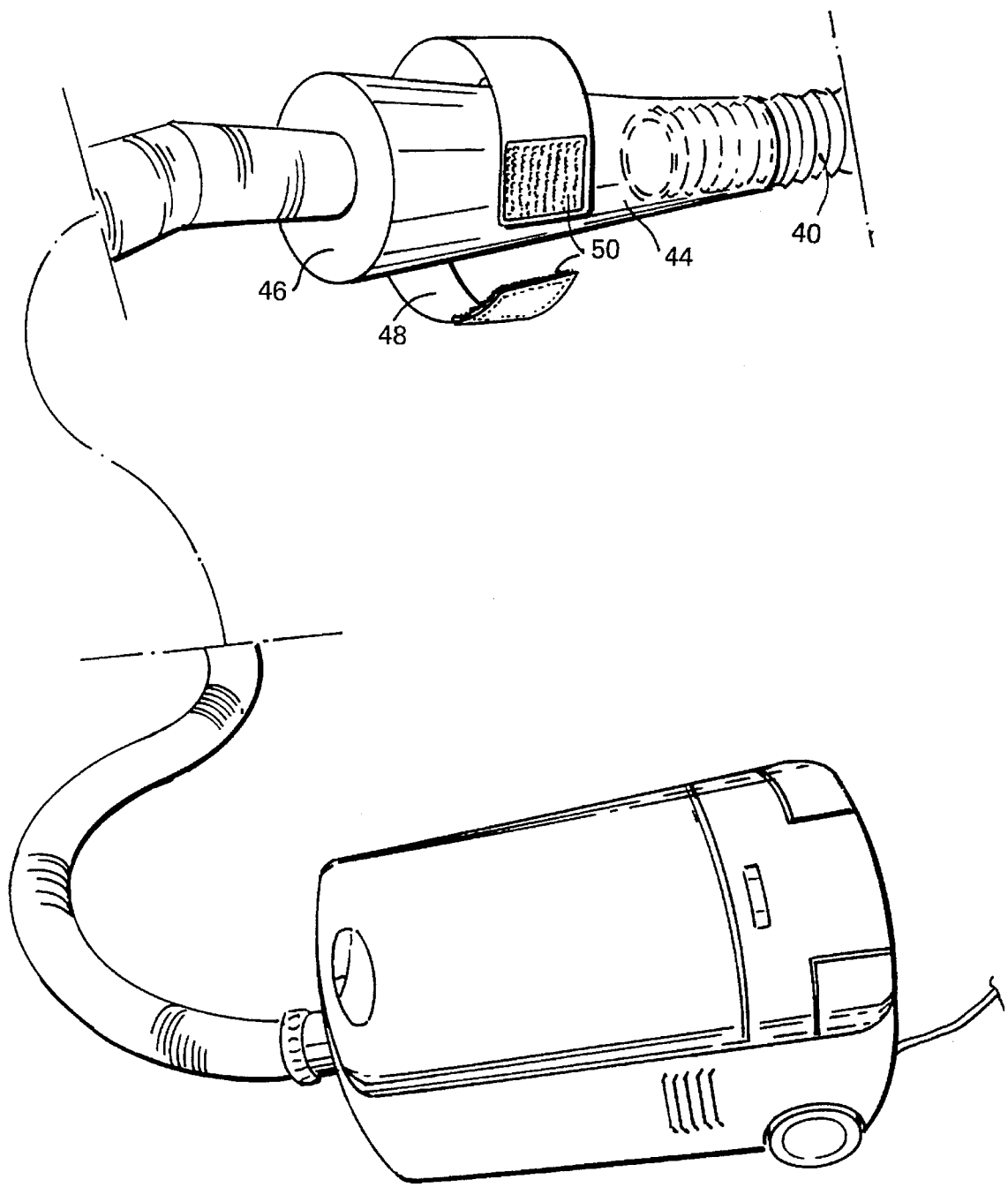
FIG. 4 is a detail of the dust extractor shown in FIGS. 1 and 2 illustrating the attachment means of the dust extractor to a vacuum source.

Referring to FIGS. 1 to 4 there is shown a dust extractor (10) comprising a housing (12) provided with a peripheral seal (14). The seal (14) can be in the form of a length or lengths of a compressible material such as natural or synthetic rubber. The sealing material being secured to the housing by means of an adhesive.

The housing (12) is divided into two compartments (16) and (18) which are separated from one another by two lengths of sealing material (20) and (22). Two gaps are provided between the lengths of sealing material (20) and (22) to allow air to flow through two tubes (24) and (26). The axis of the tube (24) is approximately tangential to the compartment (16).

The two tubes (24), (26) are of different diameters the tube (26) being of a greater diameter than the tube (24). The tube (24) extends from the compartment (16) into the outlet (38) and the tube (26) also extends from the compartment (16) into the outlet (38) as shown more clearly in FIG. 2.

Tube (26) is also provided with a spring loaded valve (28) which can be operated by a pivotally mounted lever (30) against the force of a spring (32).

The compartment (16) is provided with an access opening (34) and the access opening is provided with a reinforcement in the form of a steel washer or bush (36). The access opening can be typically about ½" or slightly larger in diameter so that the dust extractor can be used together with a range of the most common drill sizes used.

A flexible hose (40) is attached to the housing (12) by means of a connector (42). The other end of the flexible hose (40) is provided with an attachment means to allow the hose to be secured to the inlet of a vacuum source such as a vacuum cleaner.

The attachment means comprises a length of flexible material (44) which is secured at one end to the hose at a point about 3 to 4" from the end of the hose (40). The length of the material (44) is so shaped as to form an opening (46) which can be placed over the inlet to a vacuum cleaner with the free end of the hose (40) inserted into the inlet of the vacuum cleaner. The flexible material can then be wrapped around the vacuum cleaner inlet and held in position by a strap (48) which is provided with fastening means e.g. VELCRO (registered trade mark) strips (50).

In use the free end of the hose (40) is attached to the inlet of a vacuum cleaner and the housing (12) is positioned on a surface e.g. a wall or ceiling so that the access opening (34) is aligned with the position of the hole which is to be drilled. The vacuum cleaner is switched on and air will be drawn through the access opening and through the tubes (24) and (26) and then into the flexible hose (40) creating a suction within the housing (12) and the suction will maintain the housing (12) in position on the surface. The seals (14), (20) and (22) prevent air entering the housing other than through the access opening (34).

The power drill can then be operated with both hands free from the extractor and the drill bit is inserted through the access opening (34) and the drill operated to form the hole.

The operation of the valve 28 to allow air to flow through the tube 26 allows the suction effect to be released and for the dust extractor to be removed from the working surface. It will be appreciated that if the dust extractor is attached to a ceiling the valve 28 is operated by a force which tends to hold the dust extractor in position so that when the suction effect is released the dust extractor does not fall from the ceiling.

Operation of the valve (28) also allows for larger pieces of debris to flow to the suction source without causing an blockage. When the valve (28) is closed there is a fluid flow through the tube (24) all the time suction is being applied. When the valve (28) is opened there will be an air flow through both tubes (24) and (26) and larger pieces of debris can flow through the tube (26).

It will be appreciated that while the vacuum source still operates air will be drawn through the annular gap between the drill bit and the access opening (34) and there will be a flow of air through the tubes (24) and (26) drawing waste material from the drilled hole to the outlet (38) via the tubes (24), (26) which terminate in the outlet (38). The flow of air and waste material then passes into the hose (40) and the collecting bag of the vacuum cleaner. Once the hole has been drilled the vacuum cleaner can be switched off whilst holding the housing (12) in position and the housing (12) can then be removed from the surface which has been drilled.

The housing can also be provided with a slide valve. The slide valve cab comprise simply a length of material which can be moved in guides between a closed position so that it covers am opening in the housing or it can be slid for example by using a thumb to reveal the opening and therefore release the suction within the housing. If such a valve is provided in the housing the vacuum cleaner can be left running, the valve operated and the housing can be moved to another location for a further hole to be drilled.

In an alternative arrangement the valve can be in the form of a circular plate having an opening which can be rotated into register with an opening in the housing in order to release the suction within the housing.

Figure 5:
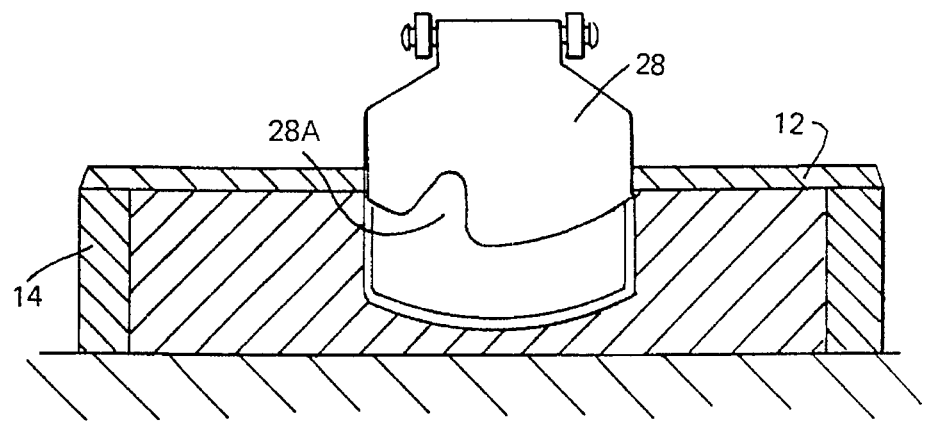
FIG. 5 shows a modified form of the dust extractor shown in FIGS. 1 to 4 inclusive.

Referring to FIG. 5 the smaller tube (24) has been dispensed with and the valve (28) has been modified by the provision of a cut-out (28A) so that all the time suction is being applied there will be an air flow through the tube (26). The inlet to the tube (26) is located in the same position as the inlet to the tube (24) shown in FIG. 1, that is tangentially to the opening (34). The valve (28) is shown in the open position. If a blockage occurs due to larger pieces of debris the valve (28) can be lifted and the larger pieces of debris can flow through the tube (26) to the outlet 30. Operation of the valve (28) as described with reference to FIGS. 1 to 4 also enables the suction effect to be released. The location of the inlet of the tube (26) approximately tangential to the opening (34) enables the air flow and the accompanying debris to flow directly into the tube (26).

Figure 7:
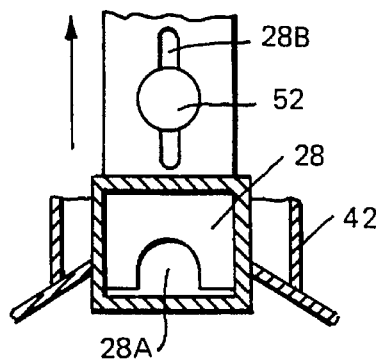
FIG. 7 shows a part view on arrow "B" in FIG. 6.
Figure 6:
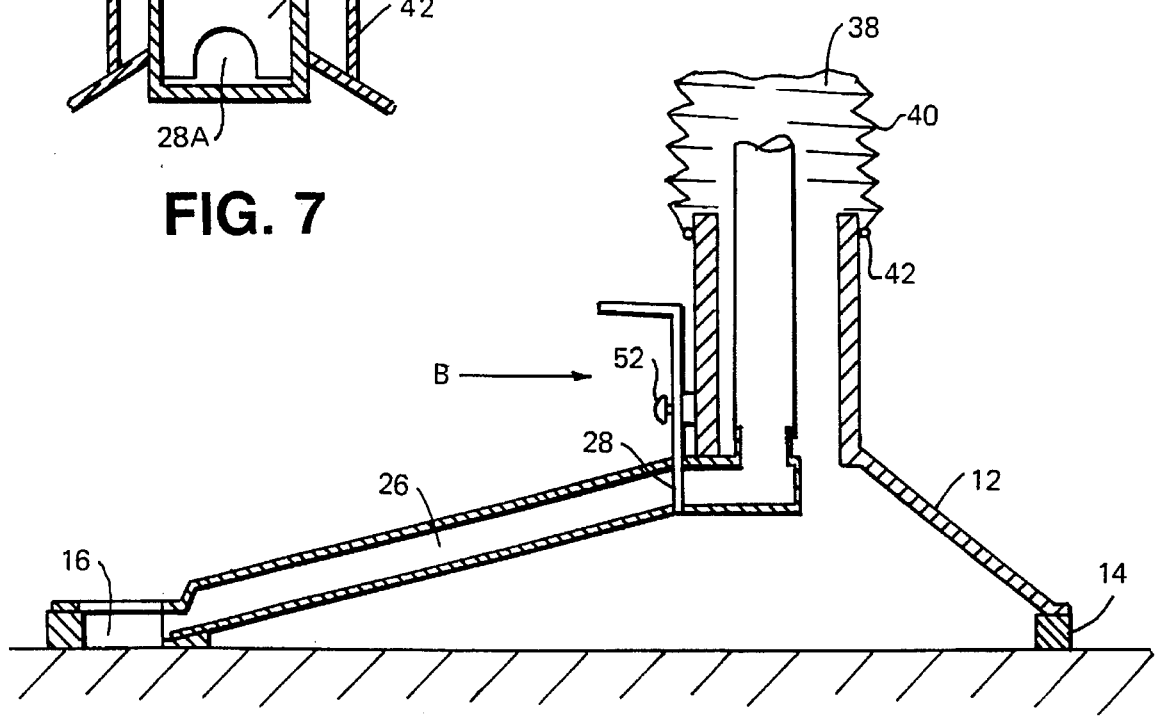
FIG. 6 shows a side elevation of a modified form of dust extractor to that shown on FIG. 5.

Referring to FIGS. 6 and 7, the valve (28) has been moved downstream from the inlet of the tube (26). The valve (28) has been modified so that it now operates as a slide. A spring (not shown) urges the valve into the closed position as shown. A screw (52) located in a slot (28B) in the valve (28) can be used to clamp the valve in a desired position. The length of tube upstream of the valve (28) allows larger pieces of debris to collect whilst still allowing drilling to continue. These larger pieces of debris can be released when drilling has ceased by opening the valve (28) whilst suction is maintained.

It is preferable that the tube (26) extends a substantial way, for example 30 cm or more into the outlet (38). Such an arrangement enables dust to be carried away and prevents dust settling in the larger compartment 18, particularly when working on a horizontal surface.

It has been found that a dust extractor according to the present invention can be used with an ordinary domestic vacuum cleaner either on vertical or horizontal surfaces e.g. walls and ceilings and the suction generated is sufficient to hold the dust extractor in position with a length of flexible hose up to 7 or 8 feet in length.

It has also been found that virtually no waste material escapes from the dust extractor and therefore avoids the need for any cleaning up to be conducted after drilling operations have ceased.

It is preferred that the housing (12) is formed from a transparent material such as Perspex (Registered Trade Mark) which allows the operator a clear view of the surface to be drilled enabling the housing to be correctly positioned at the location which has previously been marked for a hole to be drilled.

The use of the dust extractor according to the present invention is not limited to use with power tools and it can be used in conjunction with hand tools if needs be.

It will be appreciated that the form of the housing is not restricted to that illustrated above.

It will also be appreciated that a dust extractor according to the present invention enables the dust extractor to be accurately located and leaves the operator with both hands free to use the power tool or the hand tool as the case may be.

I claim:

1. A dust extractor for use with a hand or power tool, the dust extractor comprising at least two compartments which are in fluid communication with each other, sealing means to allow each compartment to be sealed to a surface, one of the compartments having an opening to provide access to the surface for a tool and the other compartment having an outlet which is connectable to a suction source, the compartments being connected by at least one fluid passage which is at least partially closed off by a valve.

2. A dust extractor as claimed in claim 1 in which the at least one fluid passage extends from the opening to the outlet.

3. A dust extractor as claimed in claim 1 in which the valve is provided with an opening enabling air to flow from the opening to the outlet.

4. A dust extractor as claimed in claim 1 having two of said fluid passages extending between the opening and the outlet one of said passages having a valve to close off fluid flow through the passage.

5. A dust extractor as claimed in claim 1 in which the valve is located at the entrance to the at least one fluid passage.

6. A dust extractor as claimed in claim 1 in which the valve is located downstream of the inlet to the at least one fluid passage.

7. A dust extractor as claimed in claim 1 in which the sealing means are arranged around the periphery of each of the compartments and the sealing means comprises a strip of compressible material.

8. A dust extractor as claimed in claim 1 in which the two at least compartments are contained within a single housing.

9. A dust extractor as claimed in claim 1 in which the two at least compartments are divided from each other by means of two lengths of sealing material with a gap provided between the lengths of sealing material to allow air to flow from one compartment to the other.

10. A dust extractor as claimed in claim 1 in which the opening is reinforced.

11. A dust extractor as claimed in claim 1 in which the outlet is provided with a length of flexible hose for attachment to a vacuum source.

12. A dust extractor as claimed in claim 11 in which the hose includes means for attachment to the inlet of a vacuum cleaner or other vacuum source.

13. A dust extractor as claimed in claim 12 in which the attachment means comprises a length of material secured at one end to the flexible hose, the other end of the length of material being wrappable around the inlet to a vacuum cleaner and to be secured thereto.

14. A dust extractor as claimed in claim 1 in which the housing is provided with a valve to allow the suction to be released from the housing.

15. A dust extractor as claimed in claim 14 in which the valve is in circular form or in the form of a slide.

16. A dust extractor as claimed in claim 1 in which the housing is formed from a transparent material.

* * * * *